Sept. 9, 1941.   L. BLAHA   2,255,500
ELECTRIC HOT PLATE
Filed June 3, 1940
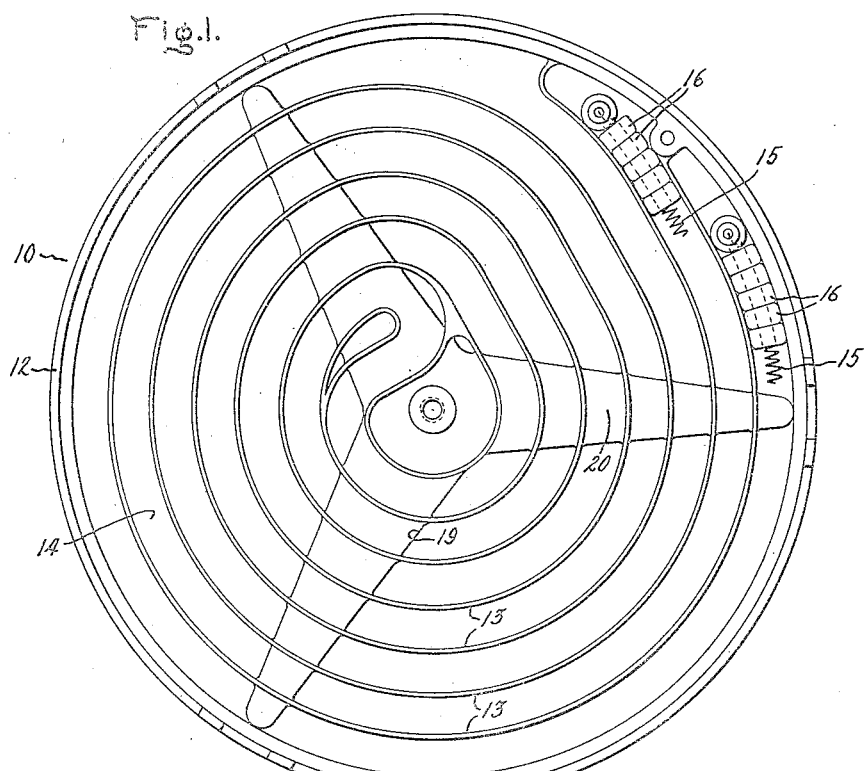
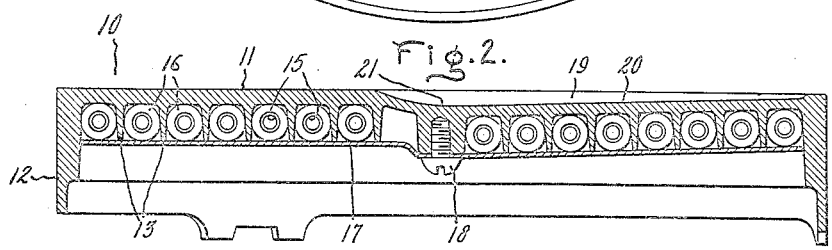
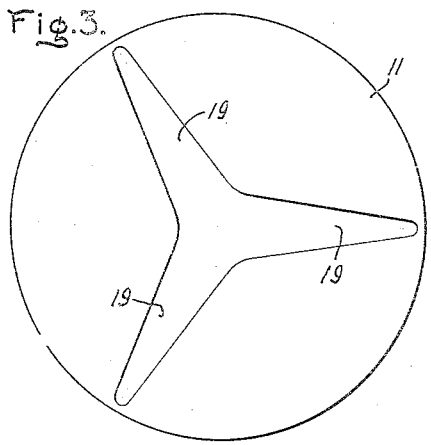
Inventor:
Leopold Blaha,
by Harry E. Dunham
His Attorney.

Patented Sept. 9, 1941

2,255,500

UNITED STATES PATENT OFFICE 2,255,500

ELECTRIC HOT PLATE

Leopold Blaha, Nuremberg, Germany, assignor to General Electric Company, a corporation of New York Application June 3, 1940, Serial No. 338,631
In Germany July 19, 1939

6 Claims. (Cl. 219—37)

This invention relates to hot plates, more particularly to electrically heated hot plates, and it has for its object the provision of an improved device of this character.

More specifically, this invention relates to hot plates having a suitable heat-conducting body formed of a suitable material, such as cast metal, and a heating element for the plate. In particular, this invention relates to hot plates of this character in which the hot plate is provided with ribs defining grooves for housing the heating element. Hot plates of this character have been somewhat unsatisfactory because the plate at times has cracked under repeated heating and cooling cycles. This invention contemplates a plate of this character which does not crack and which retains its shape.

In accordance with this invention, the upper surface of the plate is provided with a series of radial cavities which form concave ribs on the lower side of the plate. Preferably, the bottom of the cavities will be thinner than the plate. In one form of this invention the deepest part of the cavities is located at the center of the plate; and preferably, this part will have a depth about the same as the thickness of the bottom of the plate. These cavities extend outwardly toward the rim of the plate, and then flatten out in depth uniformly toward the surface at the rim.

For a more complete understanding of this invention, reference should be had to the accompanying drawing in which Fig. 1 is a bottom plan view of an electrically heated hot plate embodying this invention, a part being removed so as to illustrate certain details of construction; Fig. 2 is a sectional view of the hot plate of Fig. 1; and Fig. 3 is a top plan view of the hot plate of Figs. 1 and 2 taken on a smaller scale.

Referring to the drawing, this invention has been shown as applied to a hot plate for an electric range. It is to be understood, however, that this invention is applicable to hot plates in general. Also it is to be understood that while the hot plate shown is of disc-like or circular form, it may have other suitable shapes.

As shown in the drawing, the hot plate 10 is provided with a disc or plate-like heating body 11 having at its outer edge a downturned circular flange 12. The hot plate 11 is provided on its under surface with a series of spiral ribs 13 defining spirally arranged channels 14. Positioned within these spiral channels 14 are suitable resistance conductors 15. As shown, a pair of the channels 14 are provided, one being nested within the other, and a pair of resistance elements 15 are mounted within these channels. The resistance elements 15 are mounted in insulating beads 16, and these beads are secured in the channels by a clamping plate 17. The clamping plate 17 is secured to the plate 11 by a suitable screw fastening device 18.

The upper surface of the plate 11 is provided with a series of radially arranged cavities 19 which form on the lower side of the plate a series of radially arranged concave ribs 20. Preferably, the cavities 19 will be equally spaced apart, as shown in Fig. 3.

Preferably, the deepest part 21 of each rib 20 will be located at the center of the plate, and preferably it will have a depth about equal to the thickness of the plate. The depth of the cavities preferably will decrease uniformly as the cavities approach the outer edge of the plate, the cavities flattening out uniformly toward the upper surface as they reach this outer edge, as clearly shown in Fig. 2.

Preferably, the parts of the ribs 13 under the cavities 20 will have substantially the same height as the remaining sections of these ribs so as to facilitate the insertion of the heating elements 15 into their channels 14.

It will be observed that the bottom of the cavities is thinner than the rest of the plate. Also it will be observed that the width of the cavities is uniformly reduced from the center of the plate toward the rim. Due to this arrangement and the positioning of the cavities, the plate does not crack or warp in operation.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. An electrically heated hot plate comprising a plate, means for heating said plate, and the upper surface of said plate being provided with a series of radial cavities extending substantially throughout the radial dimension of said plate, said cavities forming on the lower side of said plate a series of concave ribs extending substantially throughout the radial dimension of said plate.

2. An electrically heated hot plate comprising a plate, means for heating said plate, and the upper surface of said plate being provided with a series of radial cavities which form on the lower side of said plate a series of concave ribs, the walls of said cavities being thinner than said plate, and said cavities and ribs extending substantially throughout the radial dimension of said plate.

3. An electrically heated hot plate comprising a plate-like mass, an electric heating element for heating substantially the entire area of said mass, said mass having in its upper surface a series of radial cavities arranged to form on the lower side of said mass a series of concave radial ribs, the greatest depth of said cavities being at the center of said mass and the depth of said cavities being reduced uniformly as the cavity approaches the outer edge of said mass.

4. An electric hot plate comprising a plate, electric heating means distributed over substantially the entire area of said plate for heating said plate, and said plate having on its upper surface a series of uniformly spaced radial cavities defining on the bottom of said plate a series of uniformly spaced radial ribs, said cavities being deeper at the center than at the outer edges and said cavities also having a width that is uniformly reduced from the center of the plate toward the outer edges thereof.

5. An electric hot plate comprising a plate-like mass having on its under surface a series of spirally arranged ribs defining spirally arranged channels for receiving a resistance conductor, said plate having on its upper surface a series of radially positioned cavities defining on the lower side of said plate a series of radial ribs, the cavities being deeper at the center of the plate and flattening out uniformly towards the edge thereof and said spiral ribs having substantially the same depth under said cavities as they have in the remaining portions of the plate.

6. An electrically heated hot plate comprising a plate, an electric heating element for heating said plate, said plate having in its upper surface a series of radial cavities arranged to form on the lower side of said plate a series of concave radial ribs, the greatest depth of said cavities being at the center of said plate and the depth of said cavities being reduced uniformly as the cavity approaches the outer edge of said plate, said greatest depth being substantially equal to the thickness of said plate.

LEOPOLD BLAHA.